(12) United States Patent
Iizuka et al.

(10) Patent No.: US 11,201,389 B2
(45) Date of Patent: Dec. 14, 2021

(54) MEASUREMENT SYSTEM, ROTARY MACHINE AND MEASUREMENT METHOD FOR THE SAME

(71) Applicant: MITSUBISHI HEAVY INDUSTRIES, LTD., Tokyo (JP)

(72) Inventors: Kenji Iizuka, Tokyo (JP); Jun Yasui, Tokyo (JP); Naoki Oyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 215 days.

(21) Appl. No.: 16/697,395

(22) Filed: Nov. 27, 2019

(65) Prior Publication Data

US 2020/0313286 A1    Oct. 1, 2020

(30) Foreign Application Priority Data

Mar. 29, 2019   (JP) .............................. JP2019-067242

(51) Int. Cl.
*H01P 1/18* (2006.01)
*H01Q 1/24* (2006.01)
(Continued)

(52) U.S. Cl.
CPC ............. *H01Q 1/248* (2013.01); *H01P 1/182* (2013.01); *H02J 50/20* (2016.02); *H02J 50/40* (2016.02);
(Continued)

(58) Field of Classification Search
CPC .. H04Q 2209/40; H04Q 2209/88; H04Q 9/00; H01Q 1/248; H01Q 13/20;
(Continued)

(56) References Cited

U.S. PATENT DOCUMENTS

2002/0130655 A1   9/2002  Okada et al.
2008/0174195 A1   7/2008  Tupper et al.
(Continued)

FOREIGN PATENT DOCUMENTS

CN   1375407   10/2002
CN   2842597   11/2006
(Continued)

*Primary Examiner* — Bryan R Perez
(74) *Attorney, Agent, or Firm* — Wenderoth, Lind & Ponack, L.L.P.

(57) ABSTRACT

A measurement system includes a stator-side unit and a rotor-side unit installed on the rotary machine. The stator-side unit includes a stator-side antenna, an oscillation unit that oscillates a microwave signal and outputs the oscillated microwave signal to the stator-side antenna, and a reception unit that demodulates the microwave signal and outputs a desired signal. The rotor-side unit includes a sensor, a rotor-side antenna that receives a microwave transmitted by the stator-side antenna and outputs the microwave signal, a power conversion unit that converts the received microwave signal into predetermined DC power and outputs the DC power, and a modulation unit that modulates a rotor output signal or a multiplication rotor output signal obtained by frequency multiplication of the rotor output signal, according to the output signal of the sensor, using the DC power output of the power conversion unit, and outputs the modulated rotor signal to the rotor-side antenna.

9 Claims, 9 Drawing Sheets

(51) Int. Cl.
 *H02J 50/20* (2016.01)
 *H02J 50/40* (2016.01)
(52) U.S. Cl.
 CPC ...... *F05D 2220/32* (2013.01); *F05D 2240/10* (2013.01); *F05D 2240/24* (2013.01)
(58) Field of Classification Search
 CPC . H01P 1/182; H02J 50/20; H02J 50/40; F05D 2240/24; F05D 2240/10; F05D 2220/32; G08C 17/02; H04W 4/38; G01M 15/14
 See application file for complete search history.

(56) References Cited

U.S. PATENT DOCUMENTS

2013/0342360 A1 12/2013 Bevly, III
2015/0372751 A1* 12/2015 Shinoda ................... H02P 9/30
                 455/66.1
2019/0181689 A1 6/2019 Oyama et al.

FOREIGN PATENT DOCUMENTS

| CN | 102111364 | 6/2011 |
| CN | 104488285 | 4/2015 |
| CN | 208141170 | 11/2018 |
| CN | 109155536 | 1/2019 |
| WO | 2017/199981 | 11/2017 |

* cited by examiner

MEASUREMENT SYSTEM, ROTARY MACHINE AND MEASUREMENT METHOD FOR THE SAME

BACKGROUND OF THE INVENTION

Field of the Invention

The present invention relates to a measurement system, a rotary machine, and a measurement method for the same. Priority is claimed on Japanese Patent Application No. 2019-067242, filed on Mar. 29, 2019, the content of which is incorporated herein by reference.

Description of Related Art

A telemeter measurement system is known as an operation monitoring system which monitors an operation state of a rotary machine such as a gas turbine. The telemeter measurement system detects the state of blades using, for example, a plurality of sensors attached to the blades of the turbine. The detection information of these sensors is wirelessly transmitted to the fixed side by a transmitter provided on the rotating side so as to correspond to each sensor.

Here, the power for driving the sensor and the transmitter attached to the rotating side is fed from the fixed side to the rotating-side power receiving module by a wireless power feeding device in a non-contact manner. As such a wireless power feeding device, an inductive power feeding type device is known in which power is fed in a non-contact manner to a rotating-side power receiving coil by a fixed-side power transmitting coil. In addition, there is known a radio wave type wireless power feeding device that generally receives a microwave transmitted from a power transmitting antenna by a power receiving antenna and converts it into power.

In addition, PCT International Publication No. WO2017/199981 discloses a wireless power feeding device that feeds power from a stator side in a non-contact manner to a plurality of power receiving antennas arranged at intervals in a circumferential direction on a rotor rotating around an axis. The wireless power feeding device includes an oscillator that oscillates a high-frequency signal, and a power transmission unit that includes a power transmitting antenna having a plurality of radiating portions which are arranged in the circumferential direction to radiate the high-frequency signal as radio waves and that extends in an arc shape in the circumferential direction.

Further, PCT International Publication No. WO2017/199981 discloses a telemeter measurement system including the above-described wireless power feeding device, a stator-side unit, and a rotor-side unit. The stator-side unit includes a reception unit that has a receiving antenna provided on the stator side and receives wireless information. The rotor-side unit includes a power receiving module including a power receiving antenna, a sensor that is driven by power received by the power receiving antenna, and detects a state of the rotor, and a transmission unit that transmits a detection signal of the sensor as wireless information. A plurality of the rotors are provided at intervals in the circumferential direction.

SUMMARY OF THE INVENTION

In the telemeter measurement system as described above, for example, in the rotor-side unit, the strain gauge and the telemeter are operated by the power that is wirelessly fed using a predetermined feeding frequency, and data is transmitted using a frequency different from the feeding frequency. In this configuration, since wireless power feeding and telemeter communication are performed at different frequencies, two radio systems and antennas are required, and there is a problem that the configuration may be complicated.

The present invention has been made in view of the above circumstances, and an object thereof is to provide a measurement system, a rotary machine, and a measurement method capable of easily simplifying the configuration.

A first aspect of the present invention is a measurement system including a stator-side unit installed on a stator side of a rotary machine; and a rotor-side unit installed on a rotor side of the rotary machine, wherein the stator-side unit includes a stator-side antenna, an oscillation unit that is configured to oscillate a microwave signal and outputs the oscillated microwave signal to the stator-side antenna, and a reception unit that is configured to demodulate the microwave signal received by the stator-side antenna to output a desired signal, wherein the rotor-side unit includes a sensor, a rotor-side antenna that is configured to receive a microwave transmitted by the stator-side antenna and outputs the microwave signal, a power conversion unit that is configured to convert the microwave signal output from the rotor-side antenna into predetermined direct current (DC) power and outputs the DC power, and a modulation unit that is configured to modulate a rotor output signal which is the microwave signal output by the rotor-side antenna or a multiplication rotor output signal obtained by frequency multiplication of the rotor output signal, according to the output signal of the sensor, using the DC power output by the power conversion unit as a power source, and outputs the modulated rotor output signal or multiplication rotor output signal to the rotor-side antenna.

In the first aspect of the present invention, the stator-side unit further includes a circulator having a first port, a second port, and a third port, the first port may be connected to an output of the oscillation unit, the second port may be connected to the stator-side antenna, and the third port may be connected to an input of the reception unit, and the circulator may receive the microwave signal output by the oscillation unit from the first port and output the received microwave signal to the second port, and receive the microwave signal output by the stator-side antenna from the second port and output the received microwave signal to the third port.

In the first aspect of the present invention, the stator-side antenna may be an annular waveguide antenna which has a plurality of openings disposed so as to continuously face the rotor-side antenna when the rotor of the rotary machine rotates.

In the first aspect of the present invention, the modulation unit may change an impedance of a semiconductor element that terminates the rotor output signal or the multiplication rotor output signal according to the output signal of the sensor, and amplitude-modulate the rotor output signal or the multiplication rotor output signal according to the changed impedance.

In the first aspect of the present invention, a plurality of the rotor-side units may be provided, the oscillation unit may include an instruction signal modulator that is configured to modulate the microwave signal to be output to the stator-side antenna with an instruction signal that instructs start of a modulation operation by the modulation unit in a time division manner for each of the rotor-side units, and the rotor-side unit may further include an instruction signal demodulation unit that is configured to demodulate the microwave signal output by the rotor-side antenna to output the instruction signal, and a control unit that is configured to cause the modulation unit to operate for a predetermined time when the instruction signal is an instruction to the rotor-side unit.

In the first aspect of the present invention, a plurality of the rotor-side units may be provided, different subcarrier frequencies may be assigned to the respective rotor-side units, the modulation unit may digitally modulate the rotor output signal or the multiplication rotor output signal with the subcarrier frequency assigned to the rotor-side unit, and the reception unit may demodulate the microwave signal output from the stator-side antenna to output the desired signal, for each of a plurality of the subcarrier frequencies assigned to the plurality of rotor-side units.

In the first aspect of the present invention, a plurality of the rotor-side units may be provided, different multiplication numbers may be assigned to the respective rotor-side units, and the modulation unit may frequency-multiply the rotor output signal by the multiplication number assigned to the rotor antenna and output a multiplication rotor output signal.

A second aspect of the present invention is a rotary machine including a rotor and a stator, and the measurement system.

A third aspect of the present invention is a measurement method using a measurement system including a stator-side unit installed on the stator side of the rotary machine, and a rotor-side unit installed on the rotor side of the rotary machine, the stator-side unit including a stator-side antenna, an oscillation unit that is configured to oscillate a microwave signal and outputs the oscillated microwave signal to the stator-side antenna, and a reception unit that is configured to demodulate the microwave signal received by the stator-side antenna and outputs a desired signal, the rotor-side unit including a sensor, a rotor-side antenna that is configured to receive a microwave transmitted by the stator-side antenna and outputs the microwave signal, a power conversion unit that is configured to convert the microwave signal output from the rotor-side antenna into predetermined direct current (DC) power and outputs the DC power, and a modulation unit that is configured to modulate a rotor output signal which is the microwave signal output by the rotor-side antenna or a multiplication rotor output signal obtained by frequency multiplication of the rotor output signal, according to the output signal of the sensor, using the DC power output by the power conversion unit as a power source, and outputs the modulated rotor output signal or multiplication rotor output signal to the rotor-side antenna, the method including modulating the output signal of the sensor as the desired signal, and outputting the desired signal, by the reception unit.

According to each aspect of the present invention, systems for wireless power feeding and telemeter communication can be made common, so the configuration can be easily simplified.

DETAILED DESCRIPTION OF THE INVENTION

Figure 1:
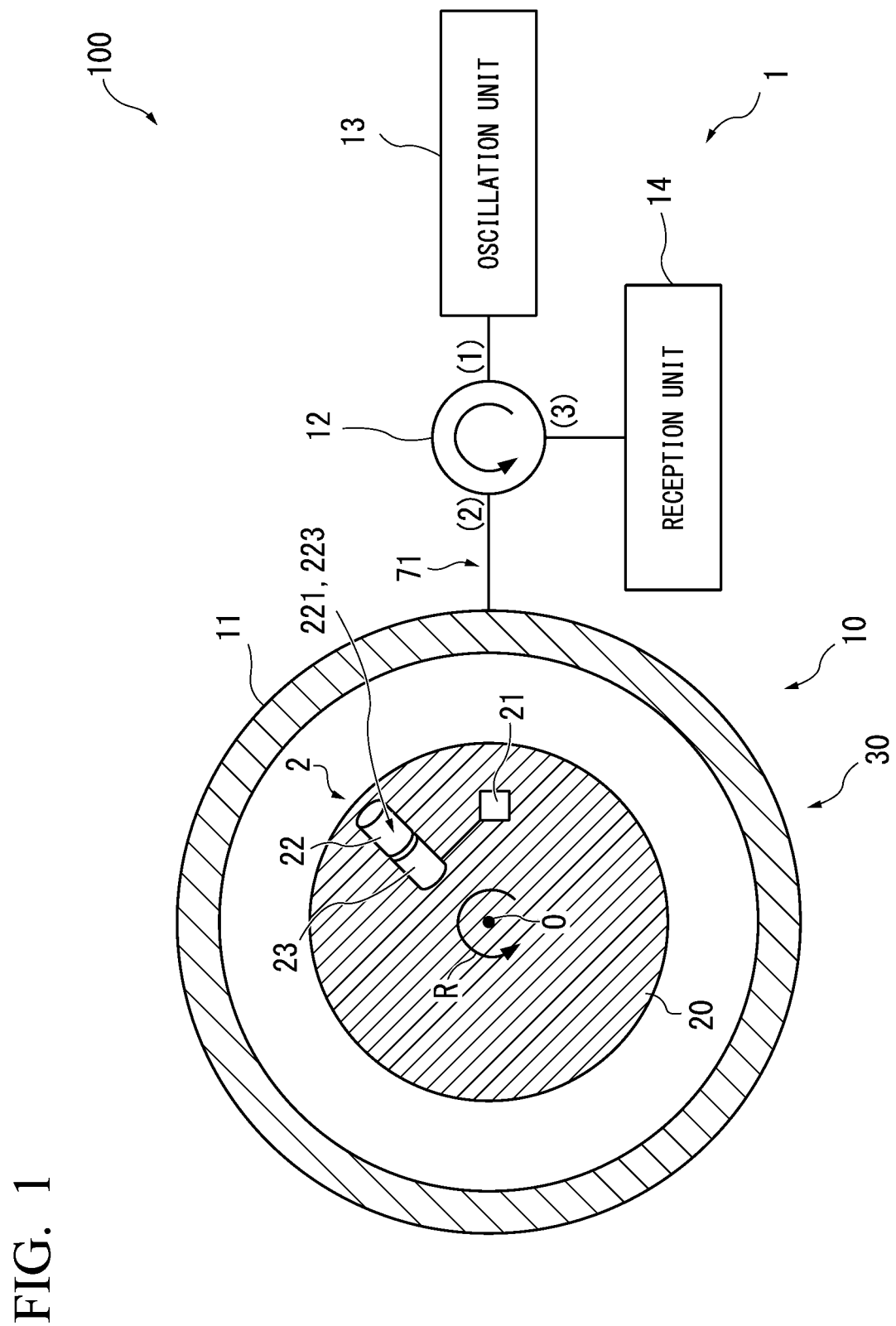
FIG. 1 is a schematic diagram showing a configuration example of a telemeter measurement system according to a first embodiment of the present invention.

Embodiments of the present invention will be described below with reference to the drawings. In the drawings, the same or corresponding components are denoted by the same reference numerals, or the reference numerals composed of the same numerals and English letters added at the end, and the description thereof is omitted as appropriate.

First Embodiment

Figure 2:
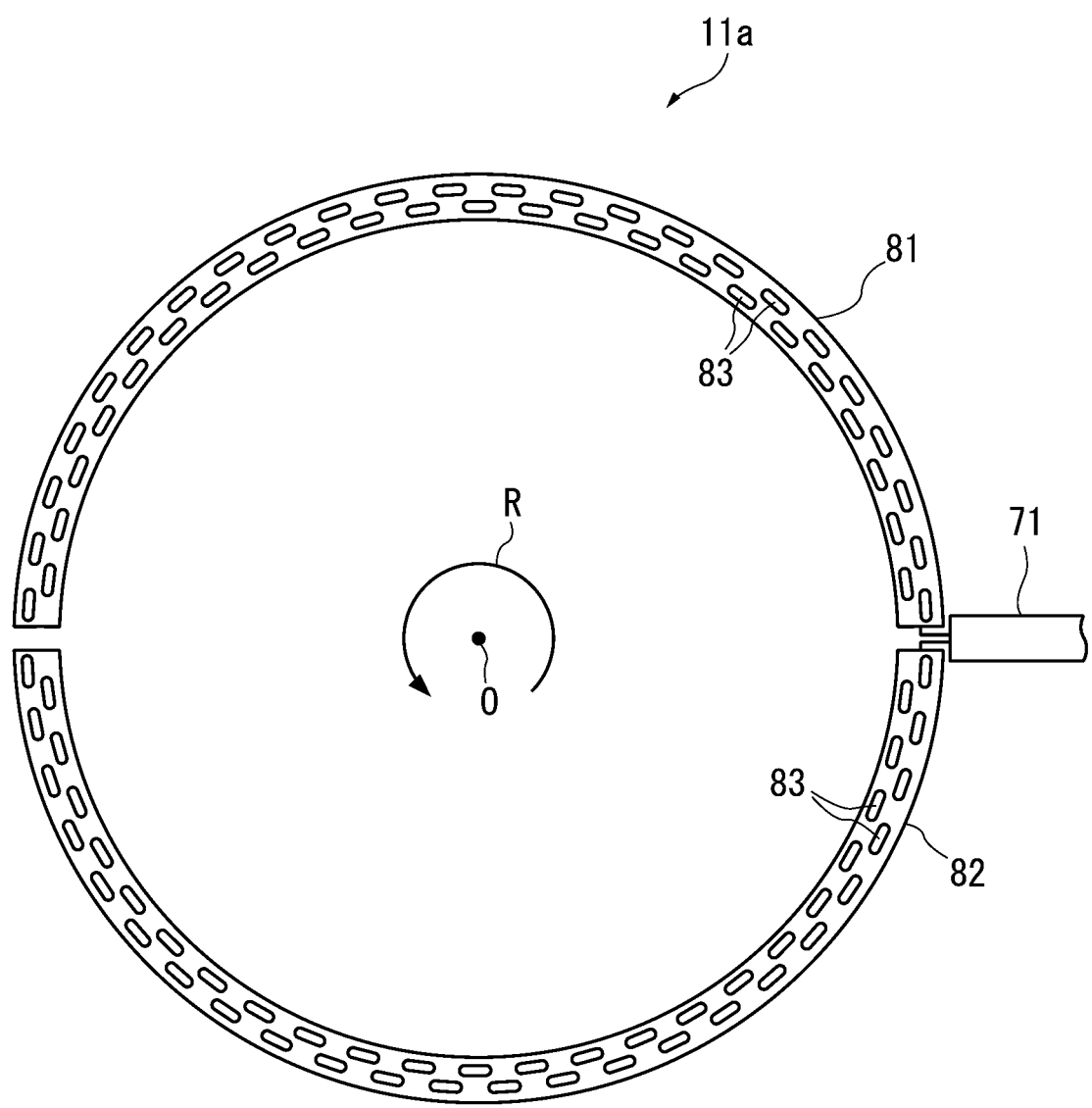
FIG. 2 is a schematic diagram showing a configuration example of a stator-side antenna 11 shown in FIG. 1.
Figure 3:
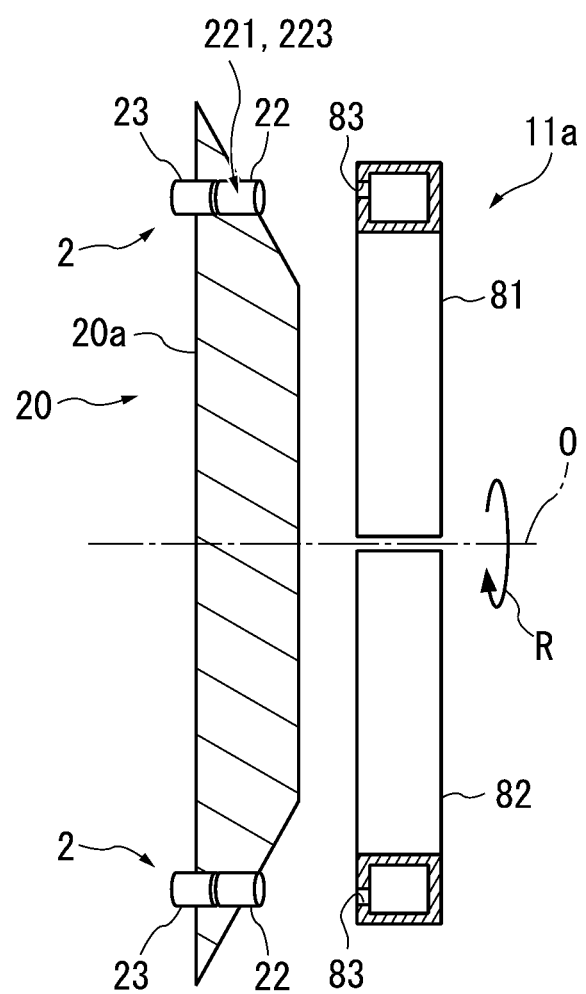
FIG. 3 is a side view schematically showing a positional relationship between a stator-side unit 1 and a rotor-side unit 2 shown in FIG. 1.
Figure 4:
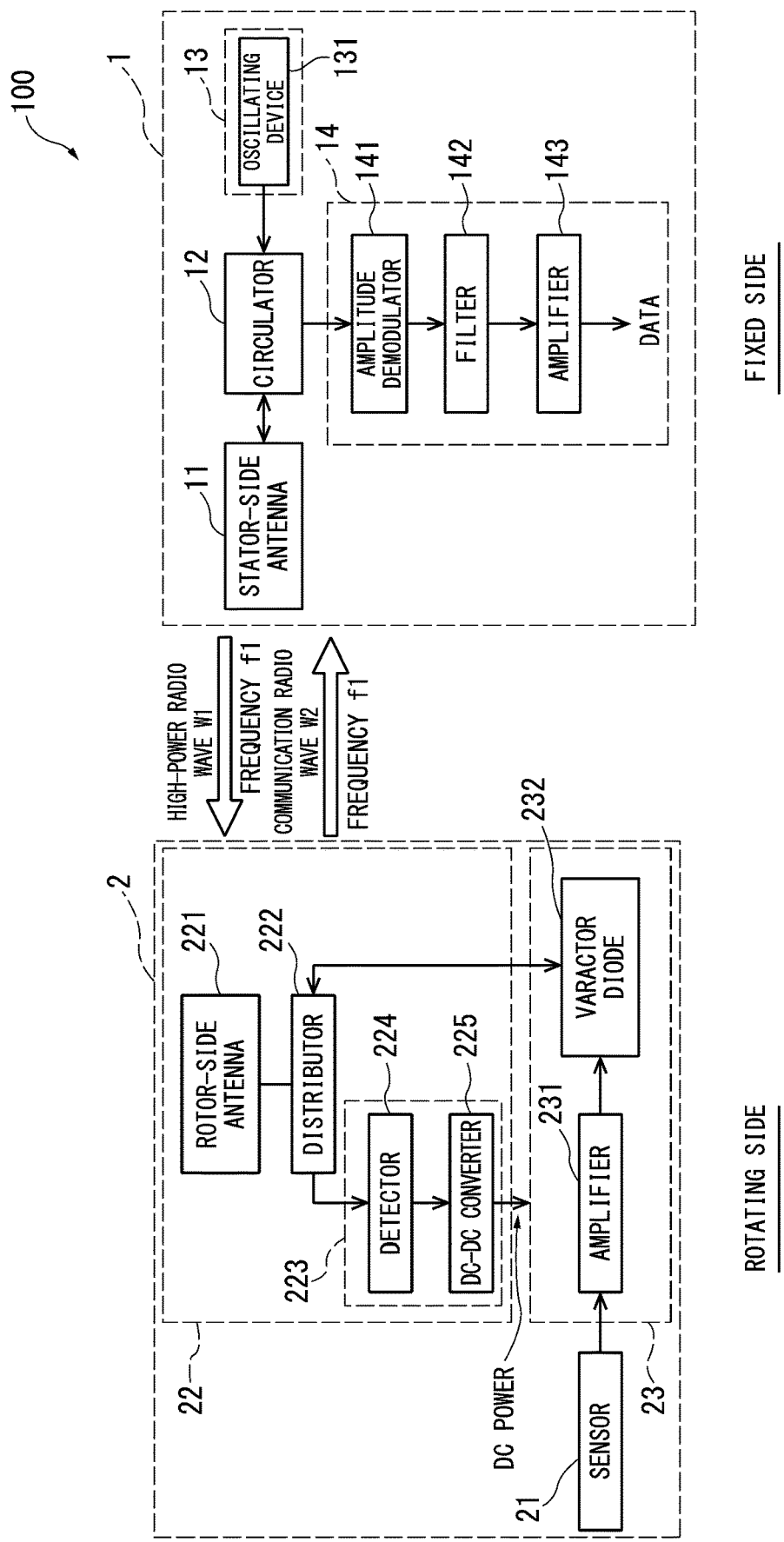
FIG. 4 is a block diagram showing a configuration example of the telemeter measurement system 100 shown in FIG. 1.

A first embodiment of a telemeter measurement system (measurement system) 100 according to the present invention will be described with reference to FIGS. 1 to 4. FIG. 1 is a schematic diagram showing a configuration example of the telemeter measurement system 100 according to a first embodiment of the present invention. FIG. 2 is a front view schematically showing a configuration example of a stator-side antenna 11 shown in FIG. 1. FIG. 3 is a side view schematically showing a positional relationship between a stator-side unit 1 and a rotor-side unit 2 shown in FIG. 1. FIG. 4 is a block diagram showing a configuration example of the telemeter measurement system 100 shown in FIG. 1.

The telemeter measurement system 100 shown in FIG. 1 includes the stator-side unit 1 and the rotor-side unit 2. The stator-side unit 1 is installed on the stator 30 side of the rotary machine (gas turbine, compressor, or the like), wirelessly transmits power to the rotor-side unit 2 by wireless power feeding, and wirelessly receives the measurement value indicating the state of the rotor 20 side from the rotor-side unit 2. The rotor-side unit 2 is installed on the rotor 20 side of the rotary machine 10 and is driven according to the power supplied by wireless power feeding from the stator-side unit 1, and wirelessly transmits the measured value indicating the state of the rotor 20 side to the stator-side unit 1. One or a plurality of rotor-side units 2 can be installed for one rotor 20. In the present embodiment, the rotor-side unit 2 functions as a telemeter (remote measurement device).

The stator-side unit 1 includes a stator-side antenna 11, a circulator 12, an oscillation unit 13, and a reception unit 14. The stator-side antenna 11 receives a microwave signal (high-frequency signal) oscillated by the oscillation unit 13 and transmits the oscillated microwave signal as a microwave (radio wave) to the rotor-side unit 2, and receives the microwave transmitted (reflected) by the rotor-side unit 2, converts the microwave into a microwave signal, and outputs the microwave signal to the circulator 12. The oscillation unit 13 oscillates a microwave signal and outputs the oscillated microwave signal to the stator-side antenna 11. The reception unit 14 demodulates the microwave signal received by the stator-side antenna 11 and outputs a desired signal. The circulator 12 has a first port (1), a second port (2), and a third port (3). The first port (1) is connected to the output of the oscillation unit 13, the second port (2) Is connected to the stator-side antenna 11, and the third port (3) is connected to the input of the reception unit 14. The circulator 12 receives the microwave signal output by the oscillation unit 13 from the first port (1) and outputs the received microwave signal to the second port (2), and receives the microwave signal output by the stator-side antenna 11 (received from the rotor-side antenna) from the second port (2) and outputs the received microwave signal to the third port (3).

On the other hand, the rotor-side unit 2 includes a sensor 21, a power receiving module 22, and a modulation unit 23. The sensor 21 is an element or device that detects a predetermined physical quantity representing a state on the rotor 20 side or a change in the physical quantity. The sensor 21 is, for example, a strain gauge that detects stress or vibration of the turbine blade, and a thermocouple that detects the temperature of the turbine blade. As shown in FIG. 3, a plurality of rotor-side units 2 are provided on the surface facing the one direction (right side in FIG. 3) of the axis O of the rotor 20 at intervals in the circumferential direction (R direction). For example, a plurality of rotor-side units 2 may be provided at intervals of a predetermined angle in the circumferential direction (R direction) so as to correspond to the rotor blades 20a of each turbine.

The power receiving module 22 includes a rotor-side antenna 221 and a power conversion unit 223. In the power receiving module 22, the rotor-side antenna 221 receives a microwave transmitted by the stator-side antenna 11 and outputs a microwave signal. In the power receiving module 22, the power conversion unit 223 converts the microwave signal (rotor output signal) output from the rotor-side antenna 221 into predetermined DC power and outputs the DC power. The modulation unit 23 modulates the microwave signal output by the rotor-side antenna 221 of the power receiving module 22 or a signal (multiplication rotor output signal) obtained by frequency multiplication of the microwave signal output by the rotor-side antenna 221, according to the output signal of the sensor 21, using the DC power output by the power conversion unit 223 of the power receiving module 22 as a power source, and outputs the modulated microwave signal or multiplication rotor output signal to the rotor-side antenna 221 of the power receiving module 22.

The stator-side antenna 11 can be, for example, an annular waveguide antenna 11a as shown in FIGS. 2 and 3. The annular waveguide antenna 11a shown in FIG. 2 can be configured with two annular waveguides 81 and 82 having a plurality of openings 83 arranged so as to continuously face the rotor-side antenna 221 of the power receiving module 22 when the rotor 20 of the rotary machine rotates. In this case, the plurality of openings 83 have a rectangular shape having a longitudinal direction in a direction parallel to the circumferential direction (R direction), and are alternately arranged along circles of two different types of radii. The microwave signal oscillated by the oscillation unit 13 is input to the annular waveguide antenna 11a through the circulator 12 and the waveguide 71. In the annular waveguide antenna 11a, the microwave according to the microwave signal oscillated by the oscillation unit 13 proceed through the waveguide 81 or the waveguide 82 while leaking from the plurality of openings 83 toward the power receiving module 22. The annular waveguide antenna 11a receives microwaves (or microwaves frequency-multiplied) radiated (reflected) from the power receiving module 22 and outputs the microwaves to the circulator 12. Since the microwave oscillated by the oscillation unit 13 is a radio wave having a wavelength of 1/multiplication number, the microwave obtained by frequency multiplication of the microwave oscillated by the oscillation unit 13 enters the waveguides 81 and 82 from the plurality of openings 83 and can travel through the waveguides 81 and 82 without being greatly attenuated.

The stator-side antenna 11 is not limited to the annular waveguide antenna 11a including the two annular waveguides 81 and 82 shown in FIGS. 2 and 3, and as described in PCT International Publication No. WO2017/199981, it can be configured with one annular waveguide, or the angle of the opening 83 can be inclined with respect to the circumferential direction (R direction). Further, a leaky coaxial cable may be used instead of the leaky waveguide antenna such as the circular waveguide antenna 11a. In addition, the stator-side antenna 11 and the rotor-side antenna 221 may be resonant antennas such as a dipole antenna, a monopole antenna, a Yagi antenna, a loop antenna, a microstrip antenna, or a microstrip array antenna, or non-resonant antennas such as a horn antenna, a parabolic antenna, or a lens antenna.

Next, referring to FIG. 4, in the telemeter measurement system 100 shown in FIG. 1, the configuration example of the oscillation unit 13 and the reception unit 14 of the stator-side unit 1, and the configuration example of the power receiving module 22 and the modulation unit 23 of the rotor-side unit 2 will be described. The oscillation unit 13 includes an oscillating device 131, and generates a microwave signal of, for example, 5.8 GHz band. The reception unit 14 includes an amplitude demodulator 141, a filter 142, and an amplifier 143, and extracts and outputs a desired data signal (signal wave) by amplitude-demodulating the received signal of the stator-side antenna 11 output from the circulator 12. Here, the output means, for example, storing in a predetermined storage device, displaying on a predetermined display device, or outputting to another computer.

The power receiving module 22 includes a rotor-side antenna 221, a distributor 222, and a power conversion unit 223. The power conversion unit 223 includes a detector 224 and a DC-DC converter 225. The modulation unit 23 includes an amplifier 231 and a varactor diode 232. The rotor-side antenna 221 receives the high-power radio wave W1 (frequency f1) transmitted from the stator-side antenna 11 and outputs the high-power radio wave W1 to the distributor 222. The distributor 222 distributes and outputs the microwave signal output from the rotor-side antenna 221 to the detector 224 and the varactor diode 232. The detector 224 converts the microwave signal into a DC signal, and outputs the DC signal to the DC-DC converter 225. The DC-DC converter 225 converts the DC power voltage input from the detector 224 into a predetermined voltage and outputs the voltage. The DC power output from the DC-DC converter 225 is used as power for driving each unit in the modulation unit 23, such as the amplifier 231, and the sensor 21, for example.

On the other hand, in the modulation unit 23, the amplifier 231 amplifies and outputs the output signal of the sensor 21. The varactor diode 232 changes the capacity according to the value of the reverse bias voltage applied between the anode and the cathode. The varactor diode 232 is also referred to as a variable capacitance diode, a varicap diode, or the like. Between the anode and cathode of the varactor diode 232, the rotor-side antenna 221 is connected through the distributor 222 and terminated, and the DC voltage output from the amplifier 231 is applied. In this configuration, the capacitance (impedance) of the varactor diode 232 changes according to the output signal of the sensor 21. The rotor-side antenna 221 reflects a part of the received high-power radio wave W1 (the reflected wave is referred to as a communication radio wave W2), but the reflection characteristic of the rotor-side antenna 221 changes depending on the change in the capacity of the varactor diode 232. Therefore, the amplitude of the communication radio wave W2, which is a reflected wave, is modulated according to the output signal (signal wave) of the sensor 21. On the other hand, in the stator-side unit 1, the reception unit 14 can obtain a data signal corresponding to the output signal (signal wave) of the sensor 21 by amplitude-demodulating the communication radio wave W2.

That is, the rotor-side unit 2 modulates the received radio wave with the data from the sensor 21 such as a strain gauge using the power received by the power receiving module 22 and returns the modulated radio wave to the stator-side antenna 11. Here, as described above, as the modulation method, for example, a method of changing the amplitude of the reflected signal viewed from the oscillation unit 13 by changing the bias of the varactor diode 232 with a voltage corresponding to the strain gauge signal and changing the load impedance viewed from the oscillation unit 13 side can be employed. The reception unit 14 receives and demodulates the signal from the power receiving module 22, which is received by the stator-side antenna 11, so the signal can be used as measurement data.

As described above, in the first embodiment, the modulation unit 23 that uses the received signal as power and modulates and returns the received radio wave according to the output signal of the sensor 21 is installed in the rotor-side unit 2, a telemeter using a frequency channel separately from the frequency of wireless power feeding is not required.

Further, as shown in FIGS. 2 and 3, the stator-side antenna 11 is disposed on a ring in the circumferential direction with respect to the rotor 20 (rotating body), and transmits radio waves to the rotor 20 side, so the rotor-side unit 2 can stably obtain fed power regardless of the rotational position, and can transmit the measurement value from the sensor 21 to the stator-side unit 1. That is, according to the first embodiment, distortion, vibration, and the like can be simultaneously measured using the same system as the wireless power feeding.

In the first embodiment, the output signal of the sensor 21 is not limited to an analog signal, and may be a digital signal. Further, for example, instead of the varactor diode 232, a transistor such as a field effect transistor (FET) may be used to drive the transistor according to the output signal of the sensor, thereby changing the impedance of the rotor-side antenna 221, and modulate the reflected wave. That is, the modulation unit 23 uses the DC power output from the power conversion unit 223 as a power source, amplitude-modulates the microwave signal output from the rotor-side antenna 221 by changing the impedance of a semiconductor element that terminates the signal according to the output signal of the sensor 21, and outputs the amplitude-modulated microwave signal to the rotor-side antenna 221.

Further, instead of the circulator 12, a directional coupler may be used to pass the output of the oscillation unit 13 to the stator-side antenna 11 and return the output of the stator-side antenna 11 to the reception unit 14 and the oscillation unit 13.

Second Embodiment

Figure 5:
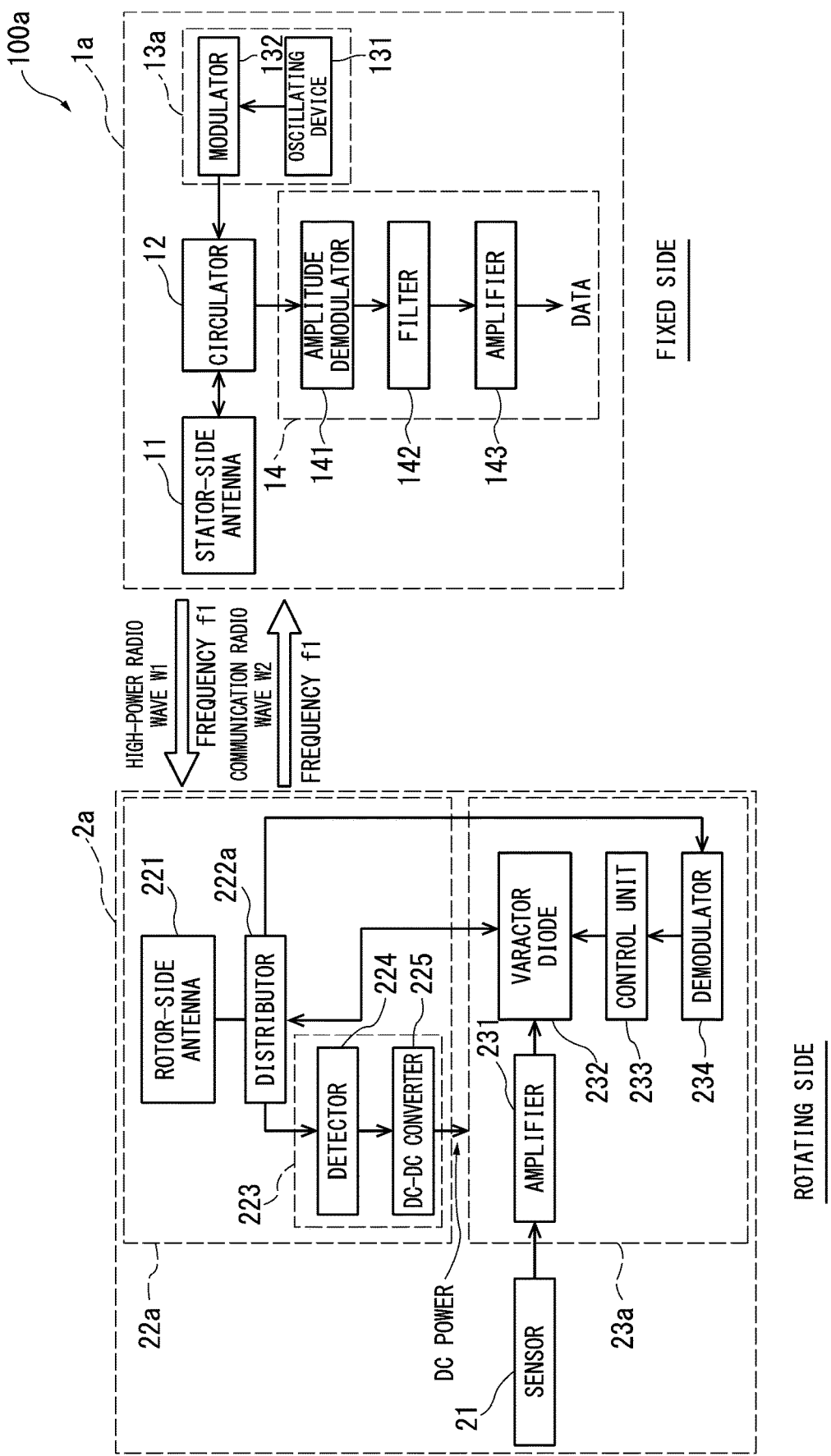
FIG. 5 is a block diagram showing a configuration example of a telemeter measurement system according to a second embodiment of the present invention.

Next, a second embodiment (a telemeter measurement system 100a) of the telemeter measurement system 100 according to the present invention will be described with reference to FIG. 5. FIG. 5 is a block diagram showing a configuration example of the telemeter measurement system 100a according to a second embodiment of the present invention. Compared to the first embodiment, the telemeter measurement system 100a shown in FIG. 5 differs in the following points. That is, when there are a plurality of rotor-side units 2a, the oscillation unit 13a includes a modulator (instruction signal modulator) 132 that modulates the microwave signal to be output to the stator-side antenna 11 with an instruction signal that instructs start of a modulation operation by the modulation unit 23a in a time division manner for each rotor-side unit. In the telemeter measurement system 100a, the rotor-side unit 2a further includes a demodulator (instruction signal demodulation unit) 234 that demodulates the microwave signal output from the rotor-side antenna 221 and outputs an instruction signal, and a control unit 233 that operates the modulation unit 23a for a predetermined time when the instruction signal is an instruction to the rotor-side unit 2a. In the power receiving module 22a, the distributor 222a distributes the input and output of rotor-side antenna 221 to the detector 224, the varactor diode 232, and the demodulator 234. The instruction signal includes, for example, an identification number (referred to as a telemeter number) which is different for each rotor-side unit 2a (or for each modulation unit 23a). In the stator-side unit 1a, the amplitude demodulator 141 extracts a desired data signal corresponding to the rotor-side unit 2a (or the modulation unit 23a) instructed by the instruction signal in synchronization with the modulation timing of the instruction signal.

In addition to the first embodiment, in the second embodiment, telemeter number information is added to the transmission power, and the modulation unit 23a has the demodulator 234 and the control unit 233, which demodulates the received power to output a signal and returns (load-modulates) the signal only when receiving a power signal that matches its own preset number. In the second embodiment, communication by a plurality of modulation units 23a is possible in a time division manner.

Third Embodiment

Figure 6:
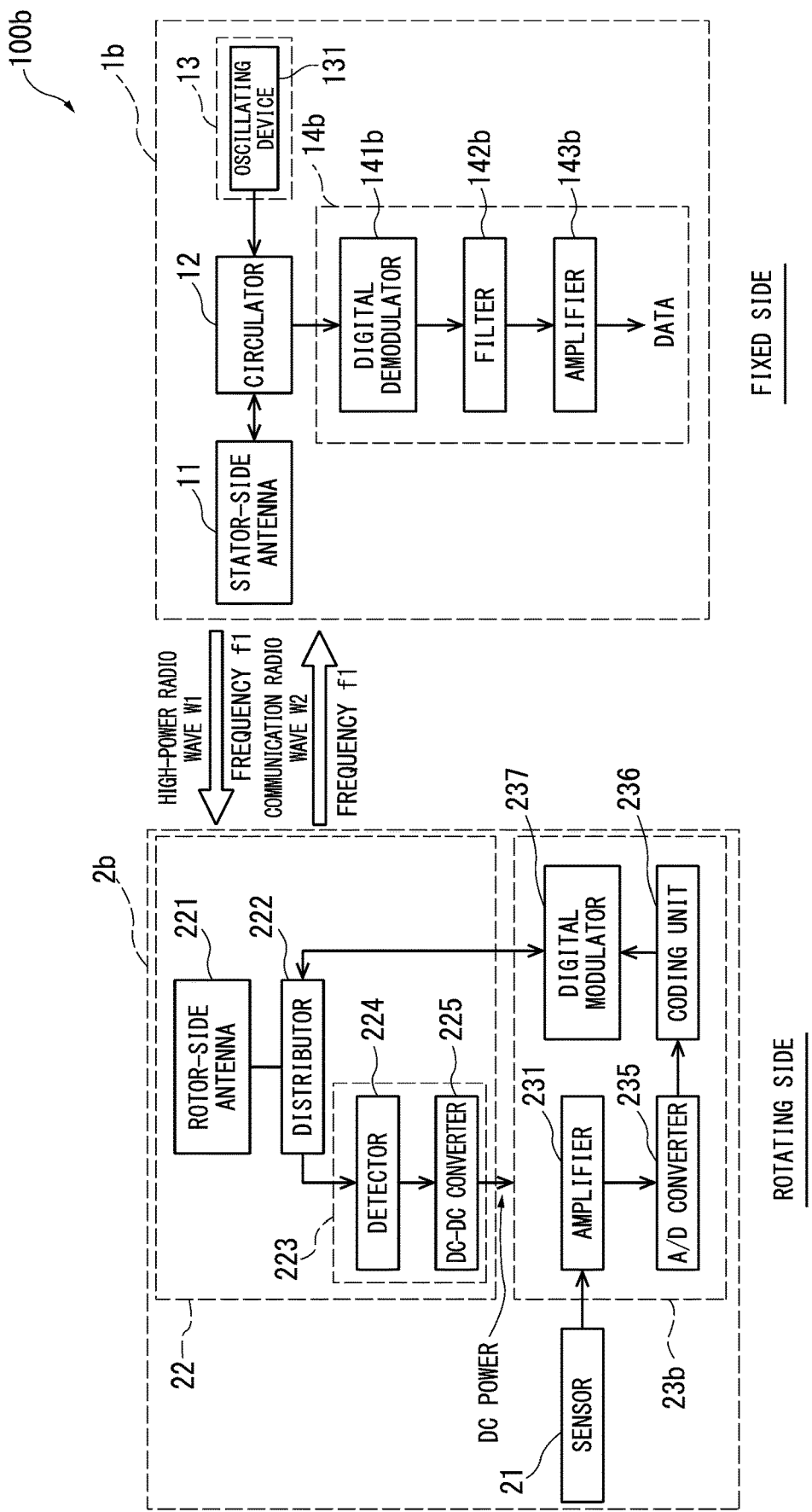
FIG. 6 is a block diagram showing a configuration example of a telemeter measurement system according to a third embodiment of the present invention.
Figure 7:
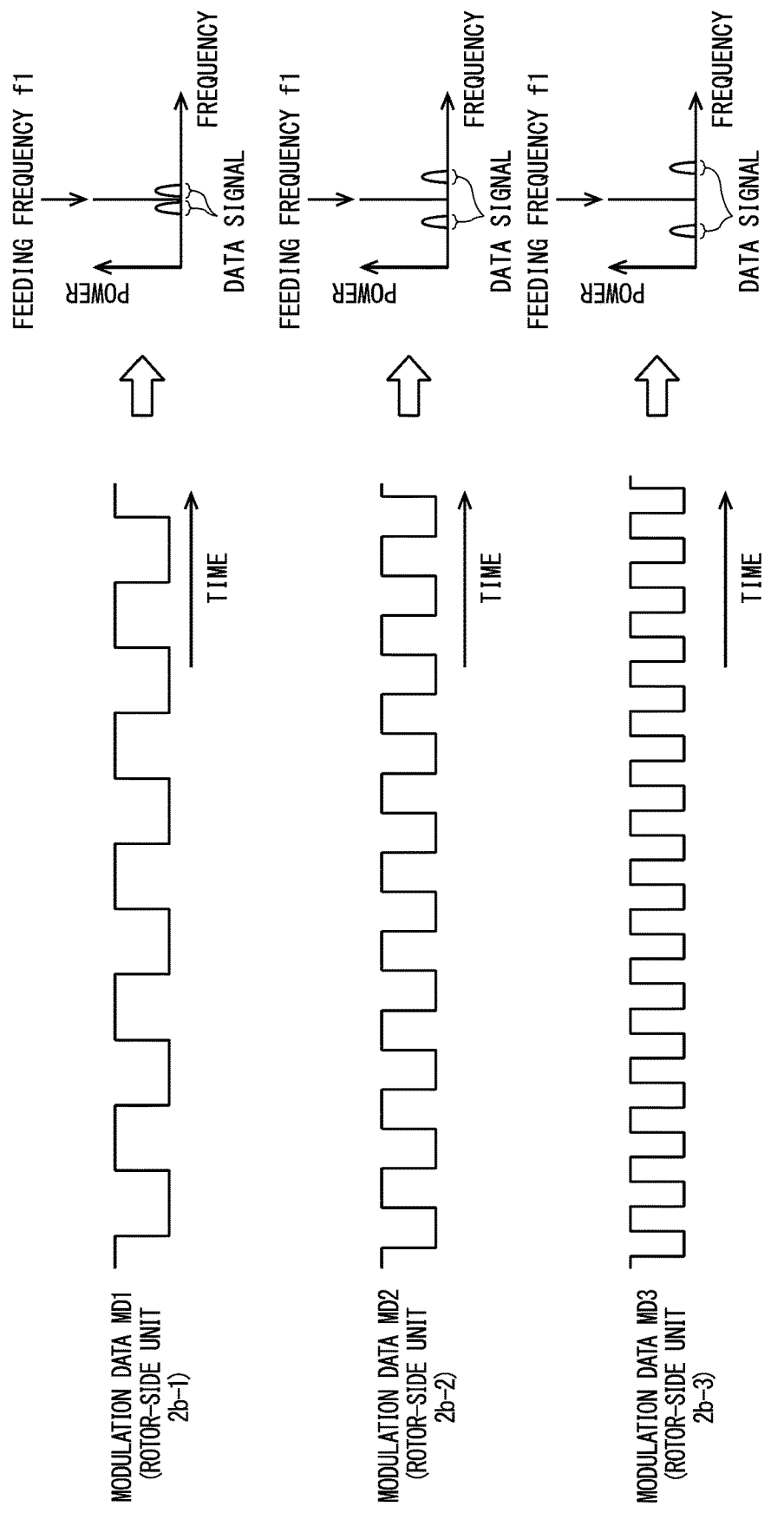
FIG. 7 is a schematic diagram for explaining an operation example in the third embodiment of the present invention.

Next, a third embodiment (a telemeter measurement system 100b) of the telemeter measurement system 100 according to the present invention will be described with reference to FIGS. 6 and 7. FIG. 6 is a block diagram showing a configuration example of the telemeter measurement system 100b according to the third embodiment of the present invention. FIG. 7 is a schematic diagram for explaining an operation example in the third embodiment of the present invention. Compared to the first embodiment, the telemeter measurement system 100b shown in FIG. 6 differs in the following points. In the telemeter measurement system 100b, when there are a plurality of rotor-side units 2b, different subcarrier frequencies are assigned in advance to respective rotor-side units 2b.

That is, as compared with the modulation unit 23 shown in FIG. 4, the modulation unit 23b includes a digital modulator 237 connected to the distributor 222 instead of the varactor diode 232, an analog/digital converter (A/D converter) 235 and a coding unit 236. The A/D converter 235 converts the output signal (analog signal) of the amplifier 231 into a digital signal. The coding unit 236 converts the digital signal output from the A/D converter 235 into a bit string according to Manchester code, using the subcarrier frequency assigned to the coding unit 236 as a clock, and outputs the bit string. In Manchester code, each bit is represented by a change from high to low or from low to high, and the clock of the signal is constant regardless of the data contents. The digital modulator 237 digitally modulates the output of the distributor 222, using the bit string output from the coding unit 236 as a signal wave. In this case, the modulation unit 23b uses the DC power output from the power conversion unit 223 as a power source, and digitally modulates the microwave signal output from the rotor-side antenna 221 at the subcarrier frequency assigned to the modulation unit 23b, according to the output signal of the sensor 21, and outputs the digitally modulated signal to the rotor-side antenna 221. Further, in the stator-side unit 1b, the reception unit 14b demodulates the microwave signal output from the stator-side antenna 11 to output a desired signal in parallel, for each of the plurality of subcarrier frequencies assigned to the plurality of rotor-side units 2b, by the digital demodulator 141b. The filter 142b and the amplifier 143b process a plurality of signals in parallel.

With reference to FIG. 7, an operation example in the case of using three rotor-side units 2b-1, 2b-2 and 2b-3 (all corresponding to the rotor-side unit 2b of FIG. 6) will be described. In this case, in the rotor-side units 2b-1, 2b-2, and 2b-3, each data (modulation data MD1, MD2, and MD3) output from each coding unit 236 is a bit string having a different clock frequency. In FIG. 7, each bit of the modulation data MD1 to MD3 represents "0" or "1". Accordingly, the frequency distribution of the communication radio wave W2 (the power distribution with respect to the frequency) includes data signals in the sidebands of frequencies having a frequency difference different from the frequency f1, with the frequency (feeding frequency) f1 of the high-power radio wave W1 as a carrier wave.

In the third embodiment, a plurality of rotor-side units 2b are used at the same time, and the modulation data frequency (subcarrier frequency) can be changed and returned by changing the communication rate in each rotor-side unit 2b. According to the third embodiment, simultaneous communication by a plurality of rotor-side units 2b is enabled by frequency division.

Fourth Embodiment

Figure 8:
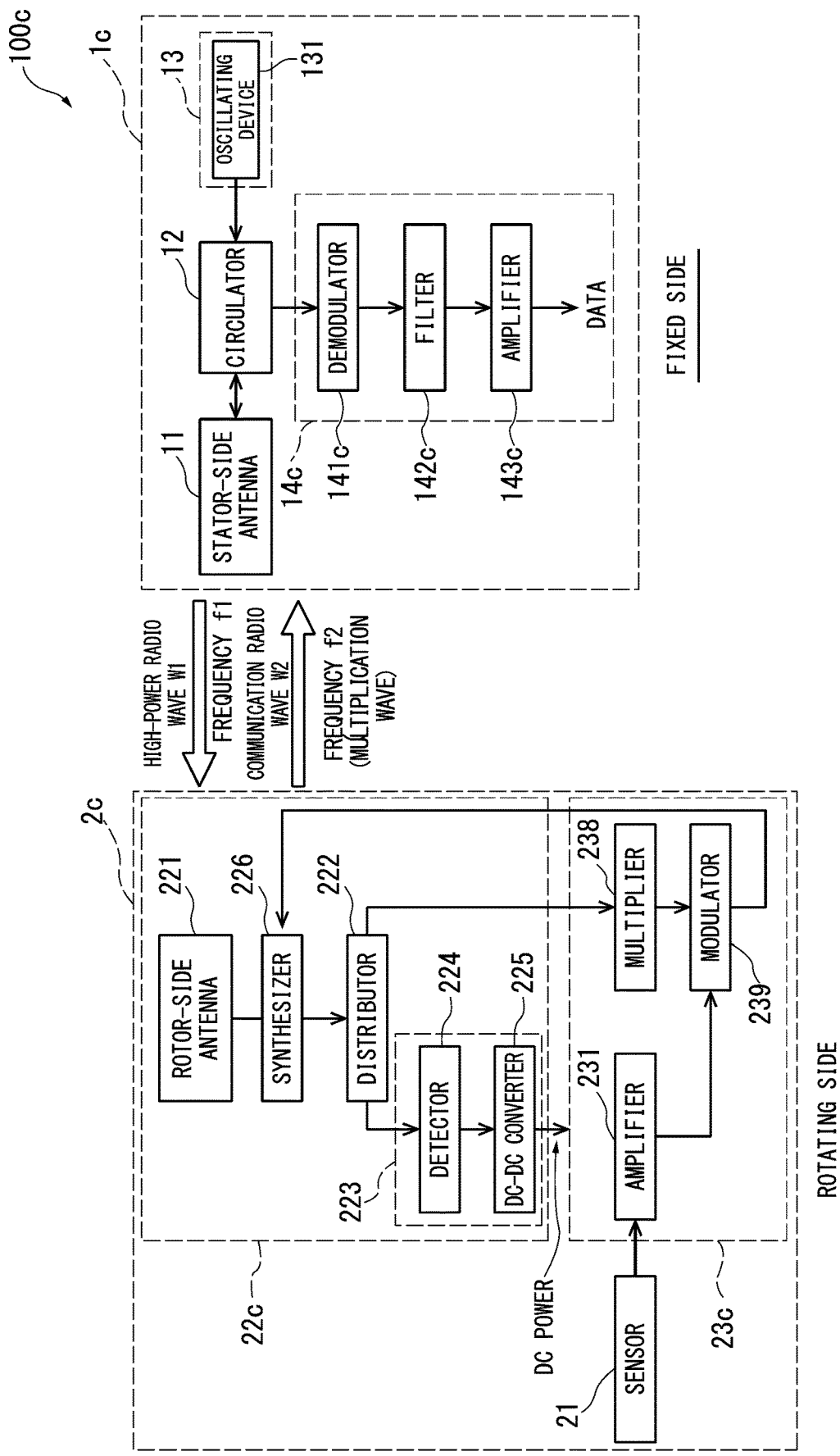
FIG. 8 is a block diagram showing a configuration example of a telemeter measurement system according to a fourth embodiment of the present invention.

Next, a fourth embodiment (a telemeter measurement system 100c) of the telemeter measurement system 100 according to the present invention will be described with reference to FIGS. 8 and 9. FIG. 8 is a block diagram showing a configuration example of the telemeter measurement system 100c according to the fourth embodiment of the present invention. FIG. 8 is a schematic diagram for explaining an operation example in the fourth embodiment of the present invention. Compared to the first embodiment, the telemeter measurement system 100c shown in FIG. 8 differs in the following points. In the telemeter measurement system 100c, when a plurality of rotor-side units 2c are provided, different multiplication numbers (an integer of 1 or more (where the multiplication number 1 is the same frequency)) are assigned in advance to respective rotor-side units 2c.

That is, the modulation unit 23c includes a multiplier 238 and a modulator 239 instead of the varactor diode 232 as compared with the modulation unit 23 shown in FIG. 4. One distribution output of the distributor 222 is connected to the multiplier 238. The multiplier 238 frequency-multiplies the microwave signal output from the distributor 222 by a multiplication number assigned to the multiplier 238 in advance, and outputs the result. The modulator 239 modulates the microwave signal output from the multiplier 238 using the output signal of the amplifier 321 as a signal wave, and outputs the modulated signal to a synthesizer 226 included in the power receiving module 22c. The synthesizer 226 is inserted between the rotor-side antenna 221 and the distributor 222 and inputs the modulated microwave signal output from the modulator 239 to the rotor-side antenna 221. As the modulator 239, for example, semiconductor elements such as varactor diodes used in the first to third embodiments described above or another modulator can be used.

Further, in the stator-side unit 1c, the reception unit 14c demodulates the microwave signal output from the stator-side antenna 11 to output a desired signal in parallel, for each of the plurality of subcarrier frequencies assigned to the plurality of rotor-side units 2c, by the demodulator 141c. The filter 142c and the amplifier 143c process a plurality of signals in parallel.

That is, in the fourth embodiment, the modulation unit 23c uses the DC power output from the power conversion unit 223 as a power source, the multiplier 238 frequency-multiplies the microwave signal output from the rotor-side antenna 221 by the multiplication number assigned to the multiplier 238, by the multiplier 238, the modulator 239 modulates the frequency-multiplied signal according to the output signal of the sensor 21, and the synthesizer 226 outputs this signal to the rotor-side antenna 221. Further, the reception unit 14c demodulates the microwave signal output from the stator-side antenna 11, and outputs a desired signal, for each of frequencies of the plurality of multiplication numbers assigned to the plurality of rotor-side units 2c.

Figure 9:
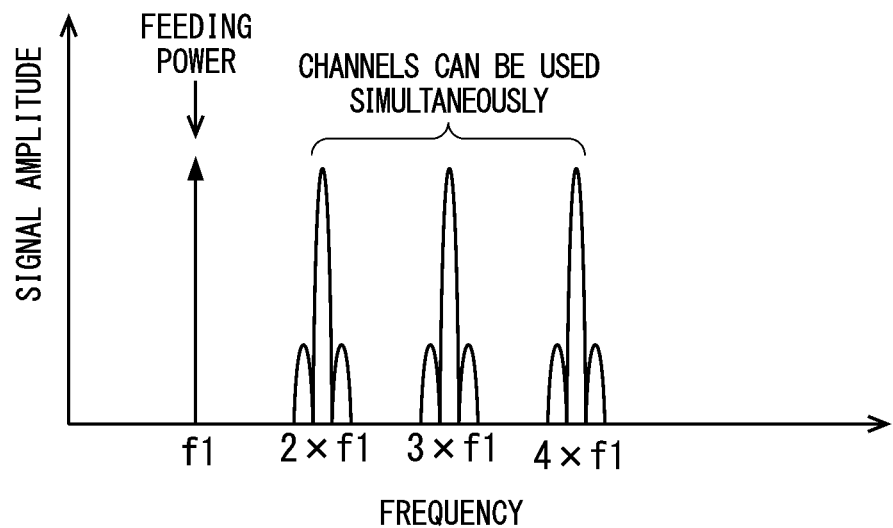
FIG. 9 is a schematic diagram for explaining an operation example in the fourth embodiment of the present invention.

With reference to FIG. 9, an example of simultaneous communication spectra on a plurality of channels when the multiplication numbers are 2, 3, and 4 will be described. In this case, as shown in FIG. 9, the frequency f2 of the communication radio wave W2, with the frequencies obtained by multiplying the frequency f1 of the feeding power by 2 times, 3 times and 4 times as the carrier frequency, are assigned to rotor-side units 2c, and thus channels can be used simultaneously.

In the fourth embodiment, the rotor-side unit 2c multiplies the received radio wave and transmits the multiplied radio wave. By changing the frequency multiplied by the plurality of rotor-side units 2c, simultaneous communication can be performed by the plurality of rotor-side units 2c. Simultaneous communication is enabled by a plurality of power receiving modules without having an oscillator in the rotor-side unit 2c.

As described above, according to each embodiment of the present invention, it is possible to acquire distortion and vibration data of a rotating body without using a telemeter having a transmission system of a frequency channel different from the radio frequency of the feed power.

Although the embodiments of the present invention have been described with reference to the drawings, specific configurations are not limited to the above-described embodiments, and design changes and the like within the scope not deviating from the gist of the present invention are included. For example, the configurations of the first to fourth embodiments can be appropriately combined. For example, a data signal may be multiplexed by time division and subcarrier frequency division by combining the configuration of the second embodiment and the configuration of the third embodiment, or a data signal may be multiplexed by time division, subcarrier frequency division, and carrier frequency division by frequency multiplication by combining the configuration of the second embodiment or the third embodiment and the fourth embodiment.

(Computer Configuration)

Figure 10:
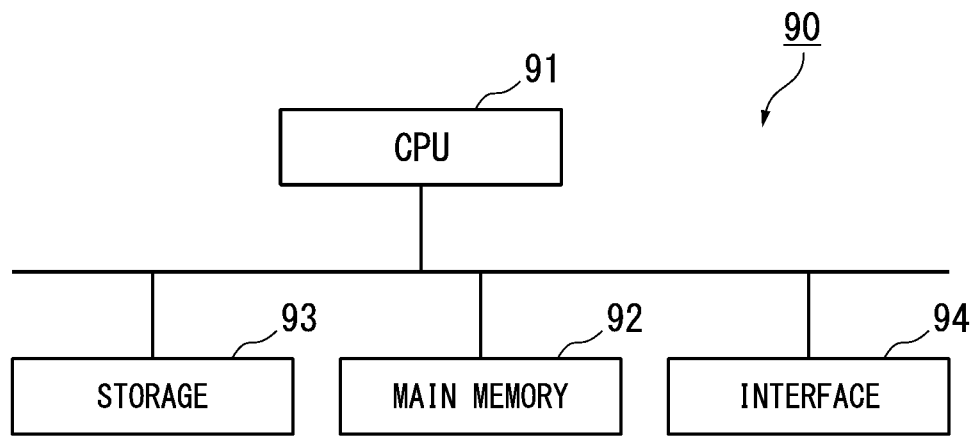
FIG. 10 is a schematic block diagram showing a configuration of a computer according to at least one embodiment.

FIG. 10 is a schematic block diagram showing a configuration of a computer according to at least one embodiment. The computer 90 includes a processor 91, a main memory 92, a storage 93, and an interface 94. The rotor-side units 2, 2a to 2c and the stator-side units 1, 1a to is can be partially configured using the computer 90. In that case, the operation of each unit is stored in the storage 93 in the form of a program. The processor 91 reads the program from the storage 93, expands it in the main memory 92, and executes the processing according to the program. The processor 91 secures a storage area corresponding to each of the storage units in the main memory 92 in accordance with the program.

The program may be for realizing a part of the functions that the computer 90 exhibits. For example, the program may exhibit a function by a combination with another program already stored in the storage or a combination with another program installed in another device. In other embodiments, the computer may include a custom large scale integrated circuit (LSI) such as a programmable logic device (PLD) in addition to or instead of the above configuration. Examples of PLDs include programmable array logic (PAL), generic array logic (GAL), complex programmable logic device (CPLD), and field programmable gate array (FPGA). In this case, a part or all of the functions realized by the processor may be realized by the integrated circuit.

Examples of the storage 93 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 93 may be an internal medium directly connected to the bus of the computer 90, or may be an external medium connected to the computer 90 through the interface 94 or a communication line. Further, when this program is delivered to the computer 90 through a communication line, the computer 90 receiving the delivered program may develop the program in the main memory 92 and execute the above process. In at least one embodiment, the storage 93 is a non-transitory tangible storage medium.

EXPLANATION OF REFERENCES 100, 100a to 100c telemeter measurement system
1, 1a to 1c stator-side unit
2, 2a to 2c rotor-side unit
10 rotary machine
11 stator-side antenna
11a annular waveguide antenna
12 circulator
13 oscillation unit
14 reception unit
20 rotor
21 sensor
22 power receiving module
23 modulation unit
30 stator
132 modulator
221 rotor-side antenna
223 power conversion unit
232 varactor diode
233 control unit
234 demodulator
235 A/D converter
236 coding unit
237 digital modulator
238 multiplier
239 modulator

What is claimed is:

1. A measurement system comprising:
a stator-side unit installed on a stator side of a rotary machine; and
a rotor-side unit installed on a rotor side of the rotary machine,
wherein the stator-side unit includes
a stator-side antenna,
an oscillation unit that is configured to oscillate a microwave signal and outputs the oscillated microwave signal to the stator-side antenna, and
a reception unit that is configured to demodulate the microwave signal received by the stator-side antenna to output a desired signal,
wherein the rotor-side unit includes
a sensor,
a rotor-side antenna that is configured to receive a microwave transmitted by the stator-side antenna and outputs the microwave signal,
a power conversion unit that is configured to convert the microwave signal output from the rotor-side antenna into predetermined direct current (DC) power and outputs the DC power, and
a modulation unit that is configured to modulate a rotor output signal which is the microwave signal output by the rotor-side antenna or a multiplication rotor output signal obtained by frequency multiplication of the rotor output signal, according to the output signal of the sensor, using the DC power output by the power conversion unit as a power source, and output the modulated rotor output signal or multiplication rotor output signal to the rotor-side antenna.

2. The measurement system according to claim 1, wherein the stator-side unit further includes a circulator having a first port, a second port, and a third port,
wherein the first port is connected to an output of the oscillation unit, the second port is connected to the stator-side antenna, and the third port is connected to an input of the reception unit, and
wherein the circulator is configured to receive the microwave signal output by the oscillation unit from the first port and outputs the received microwave signal to the second port, and is configured to receive the microwave signal output by the stator-side antenna from the second port and outputs the received microwave signal to the third port.

3. The measurement system according to claim 1, wherein the stator-side antenna is an annular waveguide antenna which has a plurality of openings disposed so as to continuously face the rotor-side antenna when a rotor of the rotary machine rotates.

4. The measurement system according to claim 1, wherein the modulation unit is configured to change an impedance of a semiconductor element that terminates the rotor output signal or the multiplication rotor output signal according to the output signal of the sensor, and amplitude-modulates the rotor output signal or the multiplication rotor output signal according to the changed impedance.

5. The measurement system according to claim 1, wherein a plurality of the rotor-side units are provided,
   wherein the oscillation unit includes an instruction signal modulator that is configured to modulate the microwave signal to be output to the stator-side antenna with an instruction signal that instructs start of a modulation operation by the modulation unit in a time division manner for each of the rotor-side units, and
   wherein the rotor-side unit further includes an instruction signal demodulation unit that is configured to demodulate the microwave signal output by the rotor-side antenna and output the instruction signal, and a control unit that is configured to cause the modulation unit to operate for a predetermined time when the instruction signal is an instruction to the rotor-side unit.

6. The measurement system according to claim 1, wherein a plurality of the rotor-side units are provided,
   wherein different subcarrier frequencies are assigned to the respective rotor-side units,
   wherein the modulation unit is configured to digitally modulate the rotor output signal or the multiplication rotor output signal with the subcarrier frequency assigned to the rotor-side unit, and
   wherein the reception unit is configured to demodulate the microwave signal output from the stator-side antenna and outputs the desired signal, for each of a plurality of the subcarrier frequencies assigned to the plurality of rotor-side units.

7. The measurement system according to claim 1, wherein a plurality of the rotor-side units are provided,
   wherein different multiplication numbers are assigned to the respective rotor-side units, and
   wherein the modulation unit is configured to frequency-multiply the rotor output signal by the multiplication number assigned to the rotor-side antenna and output a multiplication rotor output signal.

8. A rotary machine comprising:
   a rotor;
   a stator; and
   the measurement system according to claim 1.

9. A measurement method to be used in a measurement system including a stator-side unit installed on a stator side of a rotary machine, and a rotor-side unit installed on a rotor side of the rotary machine,
   wherein the stator-side unit includes a stator-side antenna, an oscillation unit that is configured to oscillate a microwave signal and output the oscillated microwave signal to the stator-side antenna, and a reception unit that is configured to demodulate the microwave signal received by the stator-side antenna and outputs a desired signal,
   wherein the rotor-side unit includes a sensor, a rotor-side antenna that is configured to receive a microwave transmitted by the stator-side antenna and outputs the microwave signal, a power conversion unit that is configured to convert the microwave signal output from the rotor-side antenna into predetermined direct current (DC) power and output the DC power, and a modulation unit that is configured to modulate a rotor output signal which is the microwave signal output by the rotor-side antenna or a multiplication rotor output signal obtained by frequency multiplication of the rotor output signal, according to the output signal of the sensor, using the DC power output by the power conversion unit as a power source, and outputs the modulated rotor output signal or multiplication rotor output signal to the rotor-side antenna, the method comprising:
   modulating the output signal of the sensor to output a desired signal, by the reception unit.

* * * * *